Aug. 30, 1938.   C. JAEGER ET AL   2,128,251
REFRIGERATING APPARATUS
Filed Dec. 11, 1936   4 Sheets-Sheet 1

Inventor
Carl Jaeger.
Bertha Jaeger.
By Miller & Miller.
Attorney

Aug. 30, 1938.   C. JAEGER ET AL   2,128,251
REFRIGERATING APPARATUS
Filed Dec. 11, 1936   4 Sheets-Sheet 3

Inventor
Carl Jaeger.
Bertha Jaeger.
By Miller & Miller,
Attorney

Aug. 30, 1938.   C. JAEGER ET AL   2,128,251
REFRIGERATING APPARATUS
Filed Dec. 11, 1936    4 Sheets-Sheet 4
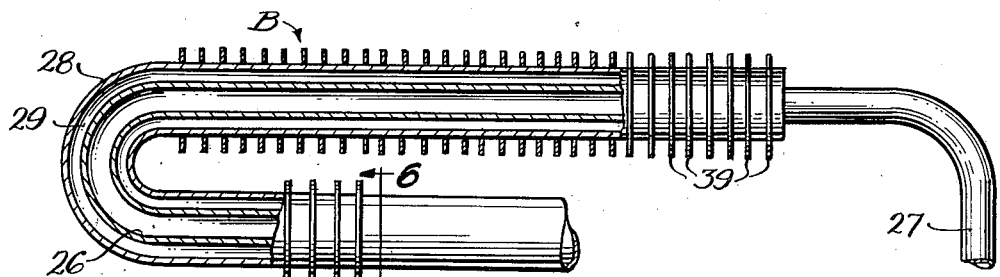
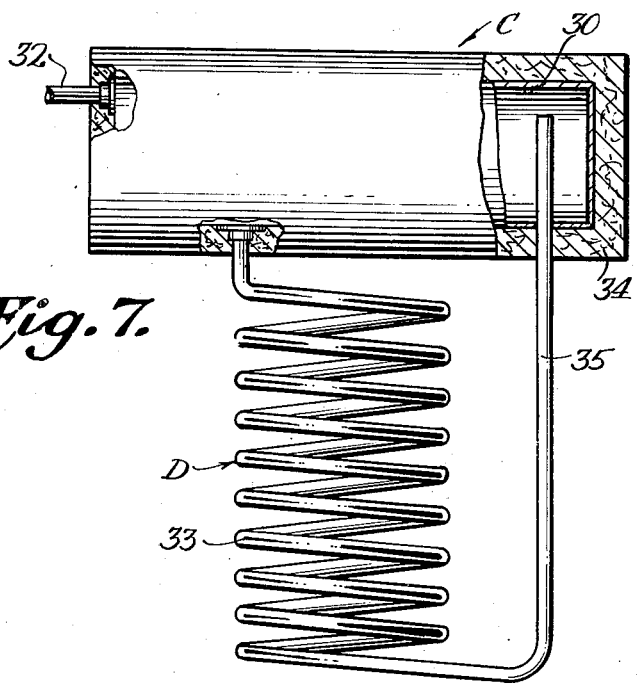
Inventor
Carl Jaeger.
Bertha Jaeger.
By Miller & Miller
Attorney Patented Aug. 30, 1938

2,128,251

UNITED STATES PATENT OFFICE 2,128,251

REFRIGERATING APPARATUS

Carl Jaeger and Bertha Jaeger, Houston, Tex.

Application December 11, 1936, Serial No. 115,414

3 Claims. (Cl. 62—118)

This invention relates to refrigerating apparatus and particularly to apparatus of the dry absorption intermittent type such as that disclosed in Letters Patent of the United States No. 1,849,931, granted to Carl Jaeger and William Jaeger, March 15, 1932.

One of the objects of the present invention is the provision of a refrigerating aparatus of the type described embodying a combined generator-absorber of simple and compact construction but having a relatively great surface area for increasing the rate of heat transfer.

Another object of the invention is the provision of a refrigerating apparatus embodying a generator-absorber having a heating element extending therethrough and provided with heat radiating fins and interposed metallic substance which is pervious to gas such as closely packed steel wool, such substance materially augmenting said fins in the transfer of heat.

Still another object of the invention is the provision of a refrigerating apparatus embodying a generator-absorber having a centrally disposed perforated or sieve-like receptacle for containing a solid absorption medium, which is alternately heated to vaporize and drive off the absorbed refrigerant and then allowed to cool to absorb the refrigerant thus reducing the pressure within the evaporator or refrigerating element so as to cause the evaporation of the refrigerant and the reduction of temperature of the adjacent environment.

A further object of the invention is the use of an absorption medium which is in solid but granular form and loosely packed to permit expansion and which is disposed in contiguous relation to the heated steel wool so as to provide for a maximum transfer of heat with minimum impediment to the passage of gas therethrough.

A still further object of the invention is the provision of a refrigerating apparatus embodying a condenser coil surrounded by a tubular jacket provided with cooling fins, the space between the coil and jacket being filled with a fluid which transfers heat rapidly such as sulphur-dioxide.

Another object of the invention is the provision of a refrigerating apparatus having a receiver for the refrigerant which is so constructed as to prevent the temperature of the refrigerating environment from lowering appreciably during the heat generating period.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings means for carrying the invention into practical effect, without limiting the improvements in their useful application to the particular construction, which for the purpose of explanation, have been made the subject of illustration.

In the accompanying drawings:

Fig. 5 is an enlarged fragmentary view, partly in elevation and partly in longitudinal section, of the condenser element;

Fig. 6 is a transverse sectional view taken on line 6—6 of Fig. 5; and

Fig. 7 is an enlarged view, partly in elevation and partly in section of the receiver-evaporator elements of the apparatus.

Figure 1:
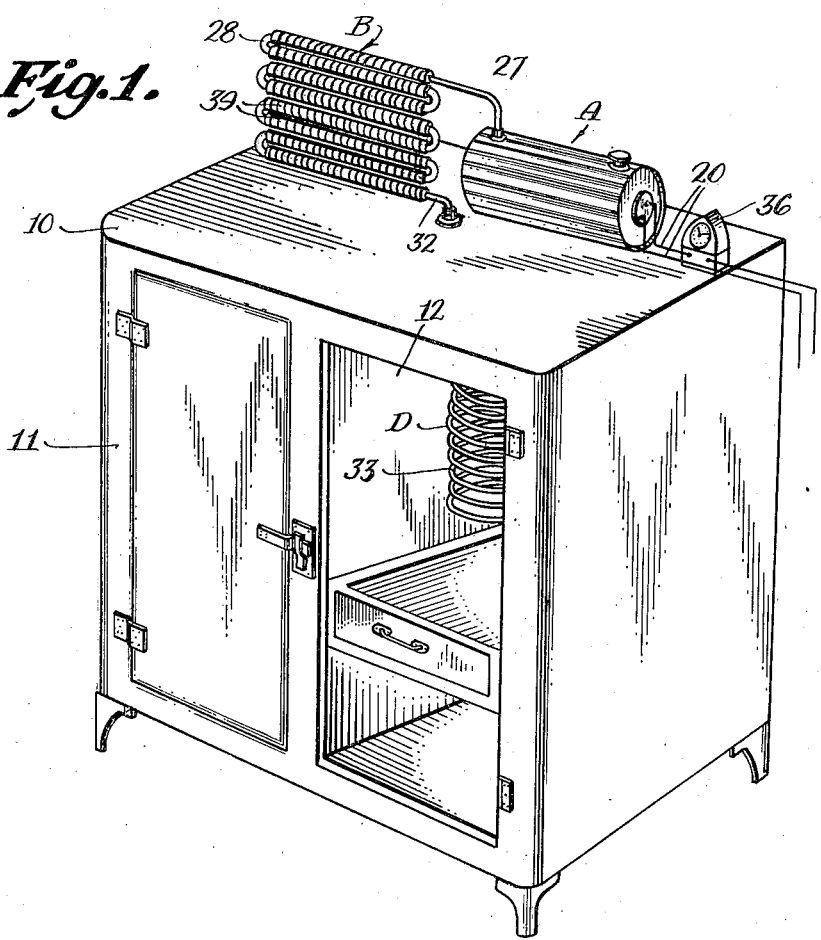
Fig. 1 is a perspective view of a refrigerating apparatus embodying the invention as applied to a domestic refrigerator.
Figure 2:
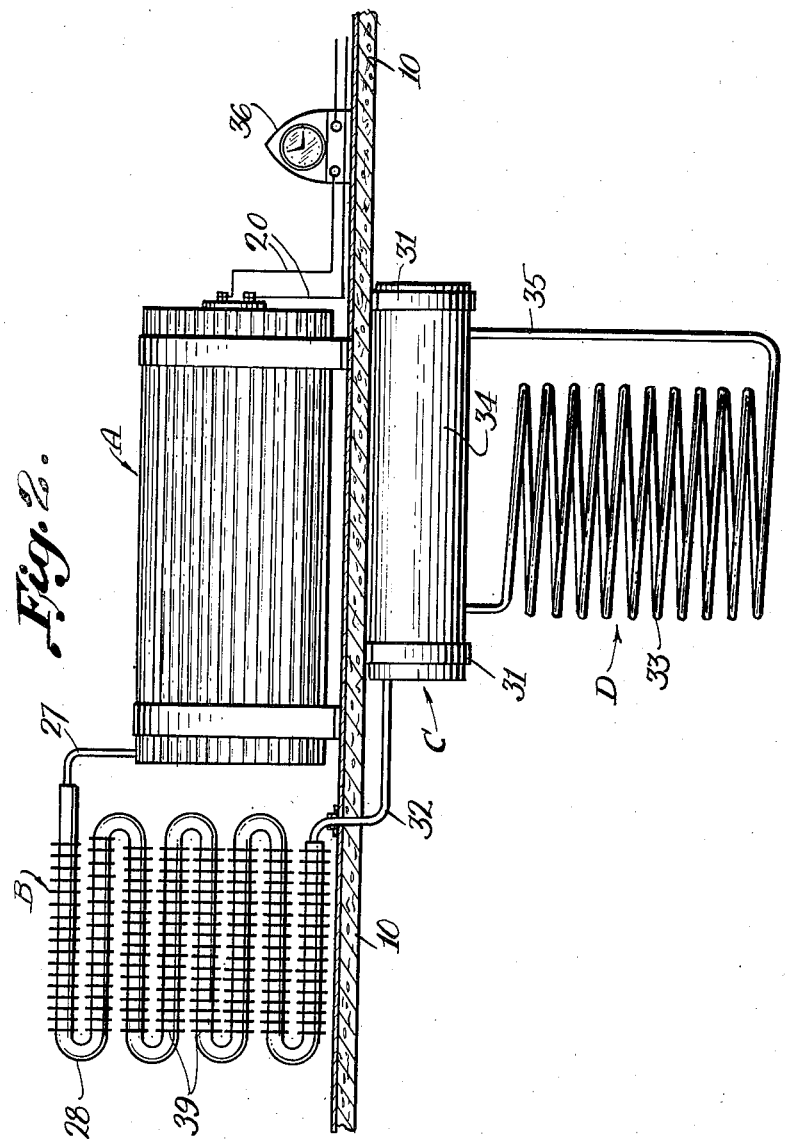
Fig. 2 is a front elevational view on a larger scale of the refrigerating apparatus shown in Fig. 1.
Figure 3:
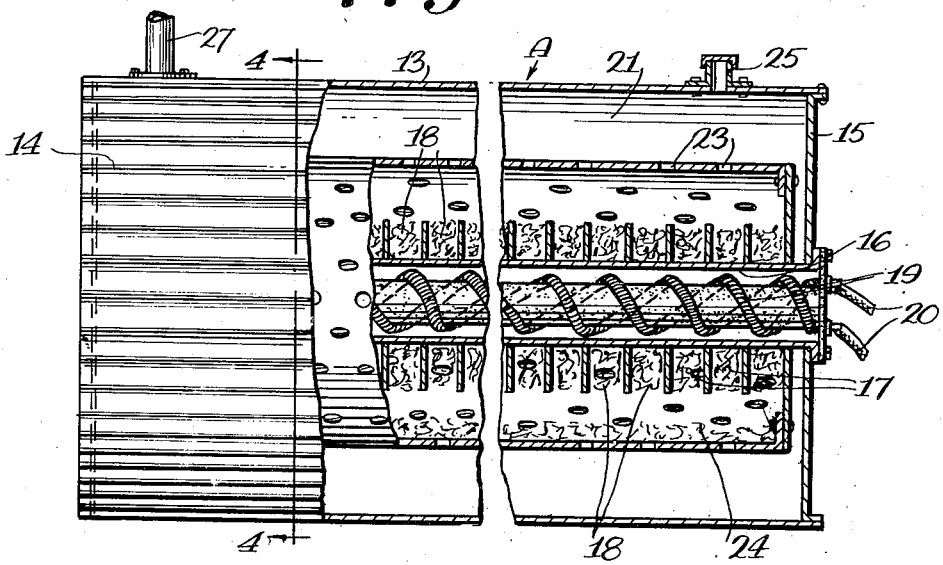
Fig. 3 is a view partly in elevation and partly in longitudinal section of the generator-absorber portion of the apparatus.
Figure 4:
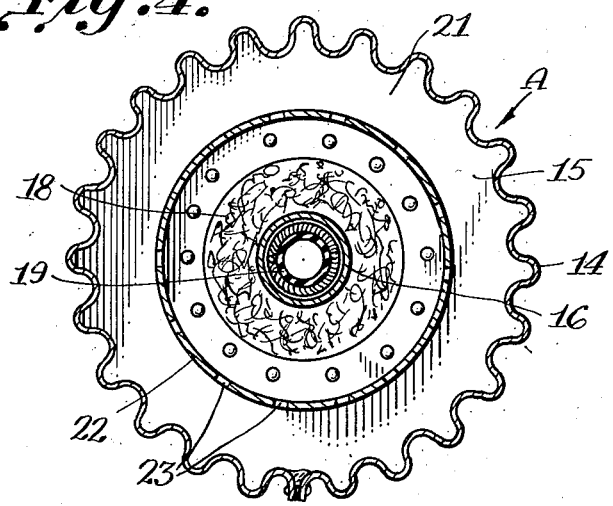
Fig. 4 is a vertical sectional view through the generator-absorber taken on line 4—4 of Fig. 3.

Referring to the drawings, and particularly to Fig. 1 thereof, a refrigerating apparatus embodying the present invention is shown as comprising essentially a generator-absorber A and a condenser B which are both mounted upon the top 10 of a refrigerating cabinet 11 and receiver C and evaporator D which are both mounted beneath said top within a refrigerating compartment 12 of the cabinet.

The generator-absorber A preferably comprises an outer receptacle 13 having a corrugated substantially cylindrical wall 14 and end walls 15 suitably secured thereto, the corrugated configuration of the cylindrical wall materially assisting in the transfer of heat without materially increasing the over-all dimensions. Mounted in the end walls 15 and extending coaxially through the receptacle 13 from end to end is a tubular member 16 provided with a plurality of spaced heat radiating fins 17 between which is closely packed a porous metallic material 18 having high heat transferring properties such as steel wool or the like. The tubular member 16 and steel wool 18 are heated intermittently for purposes presently to be described, by means of a suitable electric heating element 19 which extends coaxially through the tubular member 16 and is supplied with electric energy by wires 20. Mounted on the tubular member 16 and in spaced relation to the wall 14 of the receptacle 13, so as to form an annular chamber 21, is a cylindrical absorbent container 22 having a plurality of perforations or apertures 23 in its cylindrical wall for establishing free communication between the interior of the container 22 and the chamber 21. The container 22 is adapted to hold a solid absorbent chemical 24 such as strontium-chloride ($SrCl_2$) in divided form to which a binder is added consisting of five percent (5%) lithiumnitrate ($LiNO_3$). These substances are mixed in a dry state and then subjected to ammonia gas ($NH_3$), the lithiumnitrate absorbing the ammonia and melting into a liquid which moistens the strontium-chloride. The material thus produced has the appearance of damp snow and has a sandy consistance. By using this system the chemicals will not break down during the heating period as it is of a foraminous structure. The porous mass thus formed is in contact with the steel wool 18 so as to be readily heated thereby, and the chamber 21 is completely filled with a refrigerating gas, such as ammonia, which is introduced through a suitable filling opening 25 provided in the cylindrical wall 14 thereof. The condenser B comprises a coil 26, (Fig. 5) of any preferred configuration, the upper end of which communicated through a pipe 27 with the chamber 21 of the generator-absorber A. The coil 26 is surrounded by a jacket 28 of similar configuration which is disposed in spaced relation to the coil so as to provide a tortuous chamber 29 which is closed at its ends and filled with a gas having a relatively high coefficient of thermal conductivity, such as sulphur-dioxide. The jacket 28 is provided with a plurality of heat radiating fins 39 to increase the rate of heat dissipation.

The receiver C preferably comprises a cylindrical receptacle 30 which is secured by straps 31 beneath the top 10 of the cabinet 11 with its longitudinal axis horizontally disposed. The upper portion of the receptacle 30 communicates with the lower end of the condenser coil 26 through a pipe 32 and its lower portion communicates with the upper end of the evaporator D, herein shown as comprising a refrigerating coil 33. The receptacle 30 is surrounded by a heat insulating casing 34 compound of cork and a tar binder so as to prevent any marked temperature fluctations in the compartment 12 during the heat generating periods. The lower end of the refrigerating coil 33 is communicably connected with the receptacle 30 by means of a pipe 35 the upper end of which terminates at a level well above the bottom of the receptacle 30, as best shown in Figure 7.

The heating element 19 is intermittently energized at periods of predetermined duration by means of a suitable time controlled switch mechanism 36 which is mounted on the top 10 of the refrigerating cabinet 11.

In operation let it be assumed that the entire system is at normal room temperature under which condition the absorbent chemical 24 has absorbed the condensed refrigerant and the receiver 30 is evacuated thereof. Let it now be assumed that the clock work controlled switch mechanism is set in operation so as to temporarily energize the electric heating element 19. This will cause the heating of the fins 17 and steel wool 18 which in turn heats the solid absorbent material 24 and vaporize and drive off the refrigerant which has previously been absorbed thereby. From the generator-absorber vaporized refrigerant passes through the pipe 27 to the condenser coil 26 where its heat is dissipated so as to liquify the same, the condensation of the refrigerant in the coil 26 reducing the pressure in the generator-absorber so as to accelerate its rate of vaporization therein.

From the condenser coil 26 the liquified refrigerant passes through the pipe 32 to the receptacle 30 of the receiver C and the refrigerating coil 33 of the evaporator D. At the expiration of a time interval of predetermined duration the time controlled switch mechanism interrupts the supply of electric current to the heating element 19, thus permitting it and the directly contiguous parts and also the dry absorbent to lower in temperature. This lowering of the temperature in the system causes a decrease in pressure throughout which in turn causes the evaporation of the refrigerant in the receptacle 30 and coil 33 with the accompanied reduction in its temperature and that of the adjacent environment. The vaporized refrigerant passes back through the system and is again absorbed by the cooling absorbent chemical 24 in the container 22. This will continue for a time interval of sufficient duration to permit substantially all of the liquid refrigerant in the receptacle to be evaporated. At the expiration of such time interval the heating element 19 is again energized and the cycle of operations above described is repeated. It will be apparent that the liquefaction of the refrigerant in the condenser B and receiver C is accompanied by the dissipation of heat and hence the receptacle 30 is heat insulated by the casing 34 so as to prevent a fluctuation of the temperature within the compartment 12 of the refrigerating cabinet 11.

It will also be noted that by means of our improved system, refrigeration may be obtained without any valves or other moving parts, thus not only simplifying the construction but materially increasing the life of the apparatus.

The herein described construction may be modified in proportions and arrangement of the parts by those skilled in the art without departing from the nature and scope of the invention as defined in the appended claims.

The novel features and the operation of this device will be apparent from the foregoing description. While the device has been shown and the structure described in detail, it is obvious that this invention is not to be considered limited to the exact form disclosed and that changes may be made therein within the scope of what is claimed without departing from the spirit of the invention.

Having thus set forth and disclosed the nature of this invention, what is claimed is:

1. In a refrigerating apparatus including condenser means, receiver means in communication with said condenser means, and evaporator means in communication with said receiver means; the combination with said means of a generator-absorber comprising a chamber in communication with said condenser means for containing a refrigerating fluid, a receptacle containing a dry absorption medium disposed within said chamber in circumferentially spaced relation with respect thereto to permit the free circulation of fluid therearound and perforate for free communication between the absorption medium and the fluid, means disposed within said receptacle for heating said dry absorption medium for time intervals of predetermined duration to vaporize the refrigerating fluid absorbed thereby and to cause the same to pass through said condenser means to said receiver and thence to said evaporator means, the dry absorption medium being adapted, between the heating intervals, to absorb condensed refrigerating fluid, thus causing a reduction of the pressure within said evaporator means and an accompanied reduction of the temperature thereof, and a porous metallic substance pervious to the passage of gas, surrounding said heating means and in intimate contact with said absorption medium to increase the transfer of heat from the former to the latter.

2. In a refrigerating apparatus including condenser means, receiver means in communication with said said condenser means, and evaporator means in communication with said receiver means; the combination with said means of a generator-absorber comprising a cylindrical chamber in communication with said condenser means for containing a refrigerating fluid, a cylindrical receptacle disposed within said chamber containing a dry absorption medium, in circumferentially spaced relation with respect thereto to permit the free circulation of said fluid therearound and perforate for free communication between the absorption medium and the fluid, means for heating said dry absorption medium for time intervals of predetermined duration to vaporize the refrigerating fluid absorbed thereby and to cause the same to pass through said condenser means to said receiver and thence to said evaporator means, the dry absorption medium being adapted, between the heating intervals, to absorb condensed refrigerating fluid, thus causing a reduction of the pressure within said evaporator means and an accompanied reduction of the temperature thereof, and a body of steel wool surrounding said heating means and in intimate contact with said absorption medium to increase the transfer of heat from the former to the latter.

3. In a refrigerating apparatus including condenser means, receiver means in communication with said condenser means, and evaporator means in communication with said receiver means; the combination with said means of a generator-absorber comprising a chamber in communication with said condenser means for containing a refrigerating fluid, said chamber having a corrugated outer wall for increasing the rate of heat dissipation, a perforated receptacle disposed within said chamber and in free communication therewith containing a dry absorption medium consisting of strontium-chloride and lithiumnitrate as a binder, means for heating said dry absorption medium for time intervals of predetermined duration to vaporize the refrigerating fluid absorbed thereby and to cause the same to pass through said condenser means to said receiver and thence to said evaporator means, the dry absorption medium being adapted between the heating intervals, to absorb condensed refrigerating fluid, thus causing a reduction of the pressure within said evaporator means and an accompanied reduction of the temperature thereof, and a porous metallic substance previous to the passage of gas, surrounding said heating means and in intimate contact with said absorption medium to increase the transfer of heat from the former to the latter.

CARL JAEGER.
BERTHA JAEGER.